United States Patent [19]

Lomholt

[11] Patent Number: 5,801,637
[45] Date of Patent: Sep. 1, 1998

[54] APPARATUS COMPRISING A RECHARGEABLE BATTERY AND A DISPLAY ON WHICH THE DISPLAY SYMBOLS APPEARING DURING A CYCLE OF USE OF THE BATTERY ARE DISPLAYED IN AN ACCELERATED MANNER IN A DEMONSTRATION MODE

[75] Inventor: Ole Lomholt, Drachten, Netherlands

[73] Assignee: U.S. Philips Corporation, New York, N.Y.

[21] Appl. No.: 764,839

[22] Filed: Dec. 12, 1996

[30] Foreign Application Priority Data

Dec. 14, 1995 [EP] European Pat. Off. ............ 95203480

[51] Int. Cl.[6] ................................................ G08B 7/00
[52] U.S. Cl. ............ 340/815.69; 340/636; 320/DIG. 18
[58] Field of Search .......................... 340/636, 815.69; 324/435; 320/48, DIG. 18, DIG. 19, DIG. 21; 368/223

[56] References Cited

U.S. PATENT DOCUMENTS

| 4,398,834 | 8/1983 | Wakai | 368/223 |
| 4,835,453 | 5/1989 | Schmitdt et al. | 320/48 |
| 5,111,580 | 5/1992 | Bosscha et al. | 30/41.7 |
| 5,140,310 | 8/1992 | DeLuca et al. | 340/636 |
| 5,144,218 | 9/1992 | Bosscha | 320/44 |

FOREIGN PATENT DOCUMENTS

0417728A3  3/1991  Germany.

*Primary Examiner*—Jeffery A. Hofsass
*Assistant Examiner*—Julie Lieu
*Attorney, Agent, or Firm*—F. Brice Faller

[57] ABSTRACT

An apparatus has a display (D) on which the signs which appear on the display during a cycle of use of the apparatus are displayed in an accelerated manner in a demonstration mode.

2 Claims, 2 Drawing Sheets

APPARATUS COMPRISING A RECHARGEABLE BATTERY AND A DISPLAY ON WHICH THE DISPLAY SYMBOLS APPEARING DURING A CYCLE OF USE OF THE BATTERY ARE DISPLAYED IN AN ACCELERATED MANNER IN A DEMONSTRATION MODE

BACKGROUND OF THE INVENTION

The invention relates to an apparatus comprising: a rechargeable battery for powering inter alia a load in the apparatus, a display with signs for indicating a status of operational functions of the apparatus, and a control system for activating the signs in dependence on a condition of use of the apparatus during a cycle of use of the apparatus, which cycle corresponds to recharging and to.discharging of the rechargeable battery.

Such an apparatus, particularly a shaving apparatus, is sold under various type numbers by Philips Electronics. The rechargeable battery of this known shaving apparatus powers a motor which drives the shaving system. Depending on the type of shaving apparatus the display shows inter alia how much charge is left in the battery or to how many minutes of shaving this corresponds. Moreover, signs or symbols are shown to indicate whether the battery is to be charged or when the shaving system is to be cleaned. When such a shaving apparatus is purchased, the salesman will have to revert to the Instructions for Use in order to explain to the prospective buyer how the apparatus operates and what the meaning is of the signs and symbols on the display. Also in a situation in which the user has forgotten how the apparatus works, it will always be necessary to consult the Instructions for Use for an explanation. At such instants of purchasing and subsequently when the operation of the apparatus is to be recollected, the Instructions for Use are generally not available or have been mislaid.

SUMMARY OF THE INVENTION

It is an object of the invention to solve this problem. To this end, according to the invention, the apparatus of the type defined in the opening paragraph is characterized in that the control system includes a demonstration mode for a demonstration on the display of a cycle of use of the apparatus by displaying in an accelerated manner the signs in the sequence of their appearance during the cycle of use.

The demonstration mode simulates the cycle of use within a short time, in which all the relevant signs and symbols are shown on the display in chronological sequence. In one or more short demonstrations the salesman can then explain to the prospective buyer what happens and where the signs on the display serve for. Subsequently, the buyer himself can also start the demonstration mode to call to mind the operation of the apparatus and the meaning of the signs and symbols on the display. The demonstration mode is particularly useful in the case of apparatuses having rechargeable batteries because the correct interpretation of the signs and symbols on the display is of great importance for the user in view of the residual charge in the battery.

The invention can be used not only in shavers but also in other apparatuses having rechargeable batteries, such as depilators, tooth brushes, dental jets, screwdrivers, drills, vacuum cleaners, mixers and the like. In all these apparatuses the demonstration mode in accordance with the invention is very useful. During the demonstration mode the load of the apparatus, for example the motor of a shaving apparatus, can be activated in order to enhance the effect of the demonstration. Moreover, the same acoustic signals may be given as in a normal cycle of use in order to attract attention.

A particularly useful display feature is the display of signals for the indication of the estimated number of usage periods available with the residual charge in the battery. This is particularly important in the case of apparatuses, in particular shavers and the above-mentioned other apparatuses, which are used in accordance with a regular pattern. In the case of a shaver this is for example once a day. The user can then read directly how many shaves are approximately available before the battery is to be recharged. The necessity of recharging can also be indicated by means of a sign on the display.

In the case of a shaving apparatus it is also useful to have an indication that a minor or a major cleaning operation of the shaving system is due by means of signs indicative of a cleaning operation of the shaving system. It may be useful to include this cleaning indication in the demonstration mode, so that the user can see when he is expected to clean the shaving apparatus.

A shaving apparatus with said indications, signs or symbols may be provided with a demonstration mode, which is characterized in that the demonstration mode includes at least one of the following phases:

- a first phase in which all the signs appearing during the cycle of use are displayed at the same time, at option accompanied by the acoustic signalling;
- a second phase in which the sign for indicating the recharging of the battery and the signs for indicating the residual number of usage periods are displayed, the signs for indicating the residual number of usage periods indicating an increasing number of usage periods until a maximum number of usage periods is reached, after which the signs for indicating the residual number of usage periods give an indication that the rechargeable battery is fully charged;
- a third phase in which the signs for indicating the residual number of usage periods show a number of usage periods which decreases from the maximum number of usage periods to a first intermediate value, optionally with the electric motor running;
- a fourth phase in which a first selection of the signs for indicating a cleaning operation is shown, at option accompanied by the acoustic signalling;
- a fifth phase in which the signs for indicating the residual number of usage periods show a number of usage periods which decreases from the first intermediate value to a second intermediate value, at option with the electric motor switched on;
- a sixth phase in which a second selection of the signs for indicating a cleaning operation is shown, at option accompanied by the acoustic signalling;
- a seventh phase in which the signs for indicating the residual number of usage periods show a number of usage periods which decreases from the second intermediate value to a minimum value, at option with the electric motor switched on;
- an eighth phase in which the sign is displayed to indicate recharging of the battery, at option accompanied by the acoustic signalling;
- a ninth phase in which all the signs appearing during the cycle of use are displayed at the same time.

A further embodiment of this is characterized in that the demonstration mode further comprises: a return to the second phase after completion of the ninth phase and repeating of the second and subsequent phases in a loop. The demonstration then proceeds in an endless loop and is suitable for use at a point of sale or in a presentation.

BRIEF DESCRIPTION OF THE DRAWINGS

These and other aspects of the invention will be described and elucidated with reference to the accompanying drawings, in which.

DESCRIPTION OF THE PREFERRED EMBODIMENTS

Figure 1:
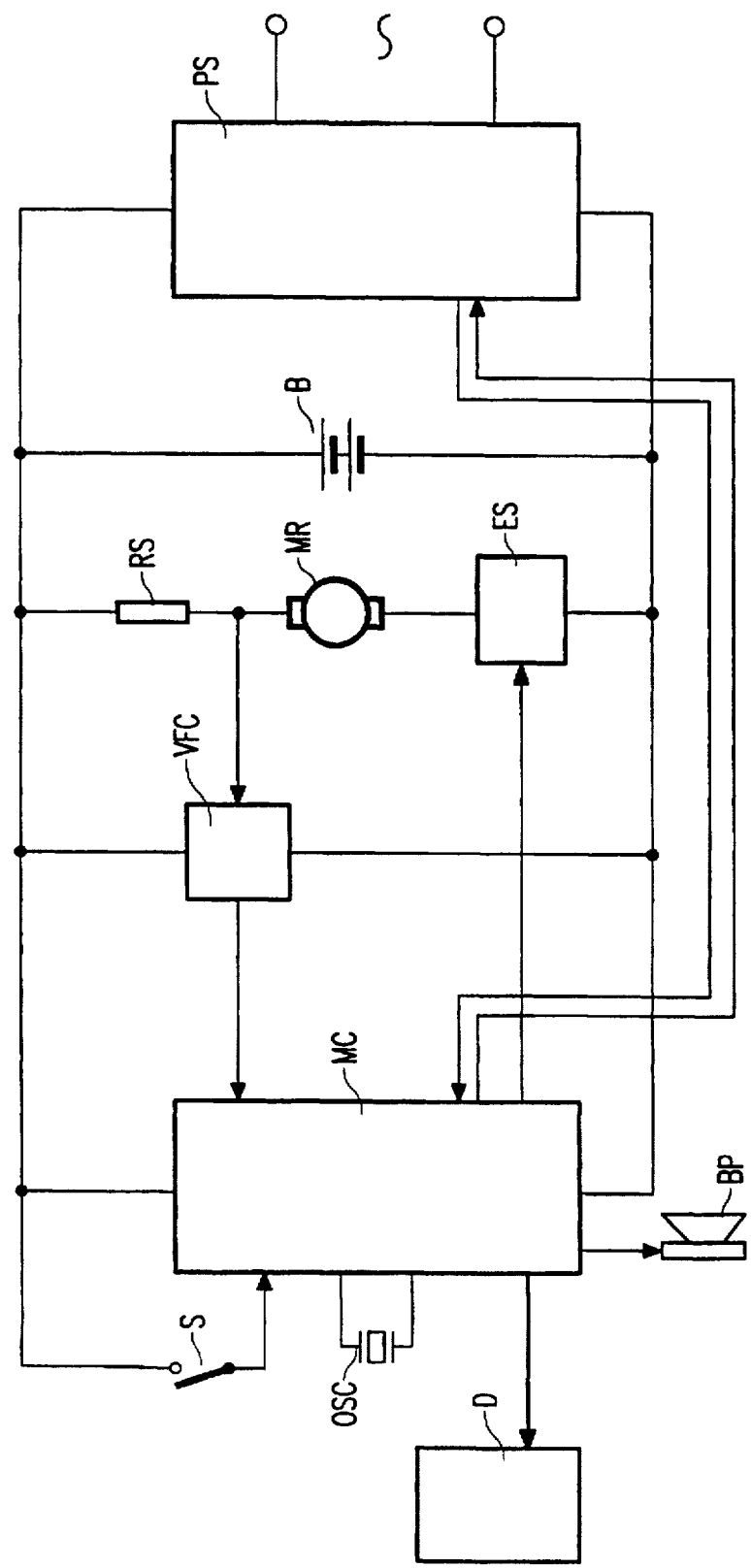
FIG. 1 shows an electrical block diagram of an apparatus in accordance with the invention.

FIG. 1 shows a functional block diagram of an apparatus in accordance with the invention. The apparatus is, for example, a shaving apparatus with rechargeable batteries, but a similar block diagram is applicable to various other rechargeable apparatuses, such as depilators, tooth brushes, dental jets, screwdrivers, drills, vacuum cleaners, mixers and the like. The shaving apparatus has a rechargeable battery B, which is recharged from the mains by means of a power supply PS. The battery B supplies current to a motor MR via a series resistor RS. An electronic switch ES connects the motor MR and the series resistor RS to the battery B under control of a microcontroller MC, which responds to an on/off switch S. The microcontroller MC applies data to a display D, for example an LCD (Liquid Crystal Display) and activates an acoustic reproducer BP. The microcontroller MC further has a time reference, for example a clock oscillator OSC, from which units of time AT are derived. When the electronic switch ES is closed, motor current flows through the series resistor RS, across which a voltage appears which is proportional to the motor current. By means of a voltage-to-frequency converter VFC the voltage across the series resistor RS is converted into a series of pulses whose repetition frequency is proportional to the motor current. The microcontroller counts the number of pulses per unit of time. Each pulse represents a given amount of charge AQ flowing from the battery B to the motor MR. For an example of such a voltage-to-current converter reference is made to U.S. Pat. No. 5,144,218. During charging the power supply PS supplies a constant current to the battery B until the battery B is fully charged or until charging is interrupted. The power supply PS and the microcontroller MC communicate with another so as to allow the microcontroller MC to determine how much charge PS has supplied to the battery B by measuring the charging time. The power supply PS can be a commercially available switchable constant current source or the power supply of the afore-mentioned shaving apparatuses.

When the motor MR is running the microcontroller MC computes the charge drain on the basis of the elapsed units of time ΔT and the number of units of charge ΔQ counted during one shave. After a number of shaves, the microcontroller computes the average charge drain per shave and the number of residual shaves still possible with the charge left in the battery B. This number is visible on the display D, so that the user knows approximately how many shaves are still available with the charge in the battery B. The average charge drain per shave is calculated by taking the sum of the individual charge drains of the successive shaves and dividing the sum by the corresponding number of shaves.

The microcontroller MC can also compute the average motor current per shave on the basis of the number of pulses supplied by the voltage-to-frequency converter VFC. From the average motor current and the residual charge in the battery B it is then possible to calculate the shaving time still available. The microcontroller MC then displays the residual shaving time as a number of "minutes left" on the display D.

Another alternative is to indicate the residual charge in the battery B in percent on the display D on the basis of the residual charge left in the battery B. The microcontroller MC then computes the residual charge in the battery B by subtracting the units of charge ΔQ consumed from the instantaneous charge in the battery B.

Figure 2:
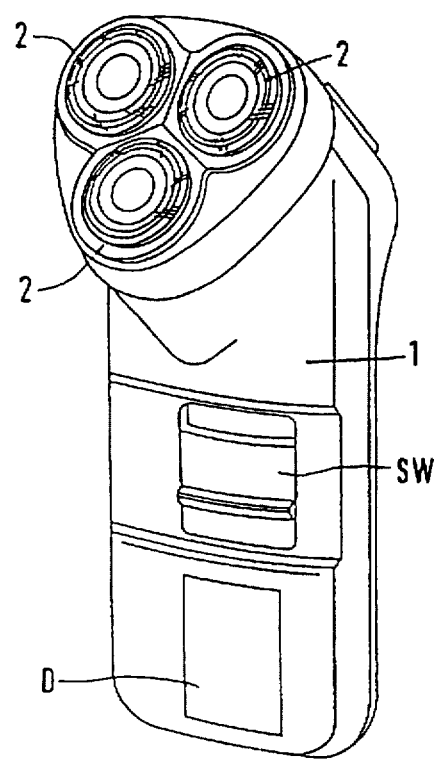
FIG. 2 shows an apparatus in accordance with the invention.

FIG. 2 shows a shaving apparatus having a housing 1 provided with the on/off switch SW and the display D. The housing 1 accommodates the motor MR, which drives the shaving system 2, and the electronic devices shown in the block diagram in FIG. 1.

Figure 3:
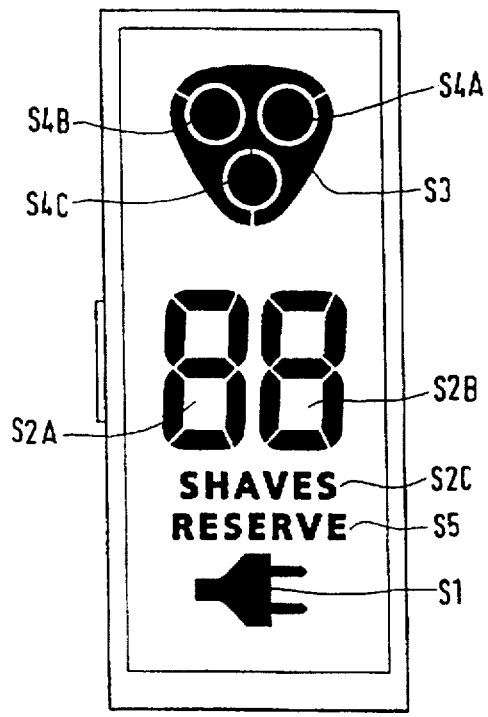
FIG. 3 shows a display for use in an apparatus in accordance with the invention.

FIG. 3 shows the display D of the shaving apparatus. The sign or symbol S1 indicates that the battery B is to be charged. The digits S2A and S2B indicate the residual number of shaves in combination with the indication S2C, which shows the word "SHAVES". The sign S3 indicates that a minor cleaning operation of the shaving system 2 is due. The signs S4A, S4B and S4C in combination with the sign S3 indicate that a major cleaning operation of the shaving system 2 is due. The microcontroller computes when a cleaning operation is due inter alia on the basis of the number of shaves performed. The sign S5 shows the word "RESERVE", which indicates that the battery B is exhausted except for a charge reserve.

The signs on the display D are displayed at given instants in a cycle of use of the battery B. The cycle of use starts with recharging of the battery B. During the cycle of use the shaving apparatus is utilized, the battery B then being discharged. The microcontroller MC can be set to a demonstration mode in which the signs on the display are displayed statically or flashing in the sequence of their appearance in a cycle of use, at option accompanied by sound signals from the acoustic reproducer BP and/or with the motor MR running.

The demonstration mode may comprise, for example, the following phases:

a first phase in which all the signs S1, S2A, S2B, S2C, S3, S4A, S4B, S4C appearing during the cycle of use are displayed, at option accompanied by the acoustic signalling BP.

The user is thus given an overview of the signs.

a second phase in which the sign S1 for indicating recharging of the battery B and the signs S2A, S2B for indicating the residual number of usage periods are displayed, the signs for indicating the residual number of usage periods indicating an increasing number of usage periods until a maximum number of usage periods is reached, after which the signs for indicating the residual number of usage periods give an indication that the rechargeable battery is fully charged.

The sign S1 symbolizes recharging of the battery B. The increasing number of usage periods symbolizing the increasing charge in the battery B. The fully charged condition of the battery B can, for example, be represented by the word "FULL", which is for example displayed as a moving news trailer by means of the characters S2A and S2B.

The second phase consequently symbolizes the charging phase of the battery B.

a third phase in which the signs S2A, S2B for indicating the residual number of usage periods show a number of usage periods which decreases from the maximum number of usage periods to a first intermediate value, optionally with the electric motor MR running.

The third phase symbolizes the use of the apparatus, during which the residual number of usage periods decreases.

a fourth phase in which a first selection S3 of the signs for indicating a cleaning operation is shown, at option accompanied by the acoustic signalling BP.

The fourth phase symbolizes the minor cleaning operation which is necessary after a number of shaves.

a fifth phase in which the signs S2A, S2B for indicating the residual number of usage periods show a number of usage periods which decreases from the first intermediate value to a second intermediate value, at option with the electric motor MR switched on.

The fifth phase is basically similar to the third phase. The usage-period counter is then further decremented.

a sixth phase in which a second selection S3, S4A, S4B, S4C of the signs for indicating a cleaning operation is shown, at option accompanied by the acoustic signalling BP.

The sixth phase symbolizes the major cleaning operation which is necessary after a greater number of shaves.

a seventh phase in which the signs S2A, S2B for indicating the residual number of usage periods show a number of usage periods which decreases from the second intermediate value to a minimum value, at option with the electric motor MR switched on, after which the sign S5 is displayed.

The seventh phase is also basically similar to the third or the fifth phase. The usage-period counter is decremented to zero. The battery B is then exhausted except for the charge reserve, which is indicated by the sign S5 with the word "RESERVE".

an eighth phase in which the sign S1 is displayed to indicate recharging of the battery B, at option accompanied by the acoustic signalling BP.

The eighth phase indicates that the battery B is to be recharged.

a ninth phase in which all the signs SI, S2A, S2B, S2C, S3, S4A, S4B, S4C appearing during the cycle of use are displayed at the same time.

The ninth phase indicates the end of the demonstration.

If desired, the demonstration mode may return to the second phase after completion of the ninth phase so as to obtain an endlessly repeated demonstration. This option is particularly useful if the power supply PS is connected to the mains voltage because the battery B is then not exhausted by the endless demonstration. The connection to the mains voltage is then detected by the microcontroller MC, which in this case can choose from a single demonstration or a recurrent demonstration. The demonstration mode can be started, for example, by pressing the on/off switch S for a longer time than required for normal operation. If desired, it may be omitted to run the motor MR in the recurrent demonstration mode. Thus, the shaving apparatus can serve as a permanent eyecatcher in a shop without any wear of the apparatus.

It will be evident that the signs on the display D are related to the function for which the apparatus is used and that in a demonstration mode of an electric tooth brush or a vacuum cleaner having rechargeable batteries other symbols or signs will be displayed in another sequence than in the shaving apparatus described hereinbefore.

I claim:

1. A shaving apparatus comprising: a rechargeable battery for powering inter alia a load in the apparatus, the load being an electric motor for driving a shaving system, a display with signs for indicating a status of operational functions of the apparatus, a number of the signs on the display giving an indication which is related to a residual charge in the rechargeable battery and a number of signs for indicating a residual number of usage periods, and a control system for activating the signs in dependence on a condition of use of the apparatus during a cycle of use of the apparatus, which cycle corresponds to recharging and to discharging of the rechargeable battery, characterized in that the control system includes a demonstration mode for a demonstration on the display of a cycle of use of the apparatus by displaying in an accelerated manner the signs in the sequence of their appearance during the cycle of use.

2. A shaving apparatus as claimed in claim 1, wherein the display further comprises signs for indicating a cleaning operation of the shaving system and a sign for indicating recharging of the rechargeable battery; and the demonstration mode includes at least one of the following phases:

a first phase in which all the signs appearing during the cycle of use are displayed at the same time, at option accompanied by the acoustic signalling, a second phase in which the sign for indicating the recharging of the battery and the signs for indicating the residual number of usage periods are displayed, the signs for indicating the residual number of usage periods indicating an increasing number of usage periods until a maximum number of usage periods is reached, after which the signs for indicating the residual number of usage periods give an indication that the rechargeable battery is fully charged;

a third phase in which the signs for indicating the residual number of usage periods show a number of usage periods which decreases from the maximum number of usage periods to a first intermediate value, optionally with the electric motor running, a fourth phase in which a first selection of the signs for indicating a cleaning operation is shown, at option accompanied by the acoustic signalling, a fifth phase in which the signs for indicating the residual number of usage periods show a number of usage periods which decreases from the first intermediate value to a second intermediate value, at option with the electric motor switched on;

a sixth phase in which a second selection of the signs for indicating a cleaning operation is shown, at option accompanied by the acoustic signalling, a seventh phase in which the signs for indicating the residual number of usage periods show a number of usage periods which decreases from the second intermediate value to a minimum value, at option with the electric motor switched on;

an eighth phase in which the sign is displayed to indicate recharging of the battery, at option accompanied by the acoustic signalling;

a ninth phase in which all the signs appearing during the cycle of use are displayed at the same time, and a return to the second phase after completion of the ninth phase and repeating of the second and subsequent phases in a loop.

\* \* \* \* \*